US009251099B2

(12) United States Patent
Kim et al.

(10) Patent No.: US 9,251,099 B2
(45) Date of Patent: Feb. 2, 2016

(54) NONVOLATILE MEMORY MODULES AND AUTHORIZATION SYSTEMS AND OPERATING METHODS THEREOF

(71) Applicants: Kwanghoon Kim, Hwaseong-si (KR); Seongsik Hwang, Seoul (KR); Junjin Kong, Yongin-si (KR); Dongsoo Jun, Seoul (KR)

(72) Inventors: Kwanghoon Kim, Hwaseong-si (KR); Seongsik Hwang, Seoul (KR); Junjin Kong, Yongin-si (KR); Dongsoo Jun, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/091,684

(22) Filed: Nov. 27, 2013

(65) Prior Publication Data
US 2014/0157006 A1 Jun. 5, 2014

(30) Foreign Application Priority Data
Nov. 30, 2012 (KR) .................. 10-2012-0138079

(51) Int. Cl.
G06F 21/79 (2013.01)
G06F 12/14 (2006.01)
G06F 21/64 (2013.01)

(52) U.S. Cl.
CPC ............ *G06F 12/1433* (2013.01); *G06F 21/64* (2013.01); *G06F 2212/202* (2013.01)

(58) Field of Classification Search
CPC .......... G06F 21/60; G06F 12/14; G06F 21/00
See application file for complete search history.

(56) References Cited

U.S. PATENT DOCUMENTS

| 6,925,570 | B2 | 8/2005 | Freeman et al. |
| 7,100,036 | B2 | 8/2006 | Schwartz |
| 7,152,095 | B1 * | 12/2006 | Motoyama et al. ........... 709/212 |
| 7,712,147 | B2 | 5/2010 | Lenssen et al. |
| 7,743,424 | B2 | 6/2010 | Lu et al. |
| 7,831,839 | B2 | 11/2010 | Hatakeyama |
| 7,979,658 | B2 | 7/2011 | Obereiner et al. |
| 8,060,925 | B2 | 11/2011 | Yoshii et al. |
| 8,108,941 | B2 | 1/2012 | Kanai |
| 8,116,455 | B1 | 2/2012 | Sussland et al. |
| 8,132,267 | B2 | 3/2012 | Gurumoorthy et al. |
| 8,150,039 | B2 | 4/2012 | de Cesare et al. |
| 8,370,644 | B2 | 2/2013 | Handschuh et al. |
| 2002/0174342 | A1 | 11/2002 | Freeman et al. |
| 2003/0084316 | A1 | 5/2003 | Schwartz |

(Continued)

FOREIGN PATENT DOCUMENTS

| JP | 2006-252021 A | 9/2006 |
| KR | 2010-0015239 A | 2/2010 |
| KR | 10-0991191 B1 | 11/2010 |

OTHER PUBLICATIONS

TN-29-11: NAND Flash Security, MICRON's Technical Notes, p. 1-10, 2005.

*Primary Examiner* — Izunna Okeke
(74) *Attorney, Agent, or Firm* — Harness, Dickey & Pierce, P.L.C.

(57) ABSTRACT

Memory modules and authorization systems include a nonvolatile memory, an authentication engine configured to receive an initialization request from a user system, configured to generate a certification value based on device identifiers of devices includes in the user system in response to the initialization request and configured to control access to the nonvolatile memory based on the certification value, and a certification value storage configured to store the certification value.

17 Claims, 10 Drawing Sheets

(56) References Cited

U.S. PATENT DOCUMENTS

| | | |
|---|---|---|
| 2006/0179302 A1 | 8/2006 | Hatakeyama |
| 2006/0179324 A1 | 8/2006 | Hatakeyama |
| 2006/0179490 A1 | 8/2006 | Lenssen et al. |
| 2006/0184799 A1 | 8/2006 | Seo et al. |
| 2007/0050852 A1 | 3/2007 | Yoshii et al. |
| 2007/0180536 A1 | 8/2007 | Kanai |
| 2008/0209117 A1 | 8/2008 | Kajigaya |
| 2008/0209553 A1 | 8/2008 | Lu et al. |
| 2009/0183009 A1 | 7/2009 | Delfs et al. |
| 2009/0228711 A1 | 9/2009 | Lim |
| 2009/0249014 A1 | 10/2009 | Obereiner et al. |
| 2009/0257595 A1 | 10/2009 | de Cesare et al. |
| 2009/0262940 A1 | 10/2009 | Lim |
| 2009/0276617 A1 | 11/2009 | Grell et al. |
| 2009/0300312 A1 | 12/2009 | Handschuh et al. |
| 2010/0082961 A1 | 4/2010 | Gurumoorthy et al. |
| 2010/0153672 A1* | 6/2010 | Jogand-Coulomb et al. .. 711/164 |
| 2011/0022852 A1 | 1/2011 | Sato et al. |
| 2011/0246738 A1 | 10/2011 | Nakamura et al. |
| 2012/0084573 A1 | 4/2012 | Rudelic et al. |
| 2012/0239944 A1* | 9/2012 | Goodman et al. ............ 713/193 |
| 2014/0047241 A1* | 2/2014 | Kato et al. .................... 713/171 |

* cited by examiner

NONVOLATILE MEMORY MODULES AND AUTHORIZATION SYSTEMS AND OPERATING METHODS THEREOF

CROSS-REFERENCE TO RELATED APPLICATIONS

This application claims the benefit of priority under 35 U.S.C. §119 from Korean Patent Application No. 10-2012-0138079 filed Nov. 30, 2012, in the Korean Intellectual Property Office, the entire contents of which are herein incorporated by reference.

BACKGROUND

1. Field

Example embodiments of inventive concepts described herein relate to nonvolatile memory devices and/or authorization systems, and more particularly, relate to operating methods of a nonvolatile memory module using a plurality of device identifiers.

2. Description of Related Art

A main memory of a computing system may be employed to overcome a speed difference between an auxiliary memory and a CPU. Thus, it may be necessary to guarantee the integrity of data and/or a fast operating speed of the main memory. Because a RAM has a fast operating speed, it may be used as the main memory of the computing system. The RAM may be a volatile memory whose data is destroyed at power-off. With the development of semiconductor technology, there is proposed nonvolatile RAMs which guarantee a fast operating speed and retain data stored therein even at power-off. Because data stored in a nonvolatile RAM is maintained even at power-off, any user may access a nonvolatile RAM which is lost or stolen. In this case, if data stored in the nonvolatile RAM is critical data, a serious security problem may arise.

To solve such a problem, a software and hardware layer certification manner may be employed. For example, a conventional certification manner (e.g., a password, a certificate, etc.) may be a software layer certification manner. This certification manner may be problematic in terms of hacking, duplication, and so on. Unlike the software layer certification manner, a device certification manner may be provided as a hardware layer certification manner. However, a conventional device certification manner may have such a problem that certification is made through device duplication.

SUMMARY

Example embodiments of inventive concepts described herein relate to nonvolatile memory devices and/or authorization systems, and more particularly, relate to operating methods of a nonvolatile memory module using a plurality of device identifiers.

Example embodiments of inventive concepts are directed to provide a memory module which comprises a nonvolatile memory; an authentication engine configured to receive an initialization request from a user system, configured to generate a certification value based on device identifiers of devices included in the user system in response to the initialization request and configured to control access to the nonvolatile memory based on the certification value; and a certification value storage configured to store the certification value.

In example embodiments, the authentication engine is configured to generate a certification key based on the device identifiers of the devices included in the user system, when the user system accesses the nonvolatile memory after generation of the certification value at a first time, the authentication engine is configured to compare the certification value and the certification key and the authentication engine is configured to control access to the nonvolatile memory according to the comparison result.

In example embodiments, the authentication engine may be configured to allow access of the user system to the nonvolatile memory when the certification value is equal to the certification key and to prohibit access of the user system to the nonvolatile memory when the certification value is not equal to the certification key.

In example embodiments, the authentication engine may include an encryption engine configured to generate the certification value based on the device identifiers of the device included in the user system, and configured to encrypt the certification value to generate an encrypted certification value; a decryption engine configured to decrypt the encrypted certification value to generate a decryption certification value; and a comparison engine configured to compare the decrypted certification value and the certification key.

In example embodiments, the authentication engine may be configured to selectively encrypt the certification value according to a selected secure level.

In example embodiments, the authentication engine may further include a deletion process engine configured to invalidate data stored in the nonvolatile memory when the certification value is not equal to the certification key.

In example embodiments, the deletion process engine may be configured to invalidate data stored in the nonvolatile memory through one selected from deleting, overwriting, insertion of a random pattern, and insertion of a same data pattern.

In example embodiments, the nonvolatile memory may be a main memory of the user system.

Other example embodiments of inventive concepts are directed to provide an operating method of a memory module including a nonvolatile memory, the operating method including receiving an initialization request from a user system; selecting one from a secure mode and a normal mode in response to the initialization request; receiving device identifiers of devices included in the user system when the secure mode is selected; generating a certification value based on the received device identifiers; and storing the certification value in a certification value storage.

In example embodiments, the receiving device identifiers of devices included in the user system may include selecting a secure level of the secure mode; and receiving the device identifiers of at least one device of the devices included in the user system according to the selected secure level, and wherein the generating a certification value based on the received device identifiers includes encrypting the certification value selectively according to the selected secure level.

In example embodiments, the operating method may further include receiving an access certification request from the user system; determining whether a set mode is a secure mode or a normal mode; generating a certification key based on device identifiers received from the user system when the set mode is the secure mode; comparing the certification key and the certification value; and controlling access of the user system to the nonvolatile memory according to the comparison result.

In example embodiments, the controlling an access of the user system to the nonvolatile memory according to the comparison result may include allowing access of the user system to the nonvolatile memory when the certification key is equal to the certification value.

In example embodiments, the controlling an access of the user system to the nonvolatile memory according to the comparison result may include invalidating data stored at the nonvolatile memory when the certification key is not equal to the certification value.

In example embodiments, the controlling an access of the user system to the nonvolatile memory according to the comparison result comprises receiving user information from the user system when the certification key is not equal to the certification value; comparing the user information and predetermined (or, select) user information; and controlling access of the user system to the nonvolatile memory based on the result of comparison.

In example embodiments, the receiving an access certification request from the user system may include determining whether the set mode is the secure mode or the normal mode; and allowing access of the user system when the set mode is the normal mode.

Yet other example embodiments are directed to an authorization system, including a first user system including at least one first device, and a memory module accessible by the first user system. The memory module includes at least one nonvolatile memory configured to store data, an authentication engine configured to control access to the at least one nonvolatile memory based on a certification value generated based a device identifier received from the at least one first device, and a storage configured to store the certification value.

The authorization system may further include a second user system including at least one second device having a device identifier different than the device identifier of the at least one first device, wherein the memory module is a main memory of the second user system. The memory module may be configured to generate a certification key based on the device identifier received from the at least one second device, and configured to control access of the second user system to the at least one nonvolatile memory based on a comparison of the certification value and the certification key.

The authentication engine may be configured to invalidate the data stored in the at least one nonvolatile memory and configured to block access of the second user system to the at least one nonvolatile memory, when the certification value is not equal to the certification key.

The authentication engine may be configured to encrypt the certification value to generate an encrypted certification value, configured to decrypt the encrypted certification value to generate a decrypted certification value, and configured to compare the decrypted certification value and the certification key.

The first user system may include a plurality of first devices having device identifiers different from each other, the memory module may be configured to receive an initialization request from the first user system to set a secure level of the memory module, and configured to select at least one of the plurality of first devices according to the set secure level, and the certification value may be based on the device identifiers of selected devices.

With example embodiments of inventive concepts, a certification value may be generated based on device identifiers of devices connected with an authorized user system, and an access of an unauthorized user to a nonvolatile memory may be limited based on the certification value. Thus, an access of an authorized user system to a nonvolatile memory module may be only allowed.

Also, because randomness of a certification value and security of the certification value increase according to a secure level and devices installed and included in a user system are used, duplication and movement of a certification element may be impossible. Thus, there may be provided a memory module with improved security.

In addition, in a case where an unauthorized user system accesses a nonvolatile memory module, the nonvolatile memory module may invalidate data stored therein. Thus, there may be provided a memory module with improved security.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
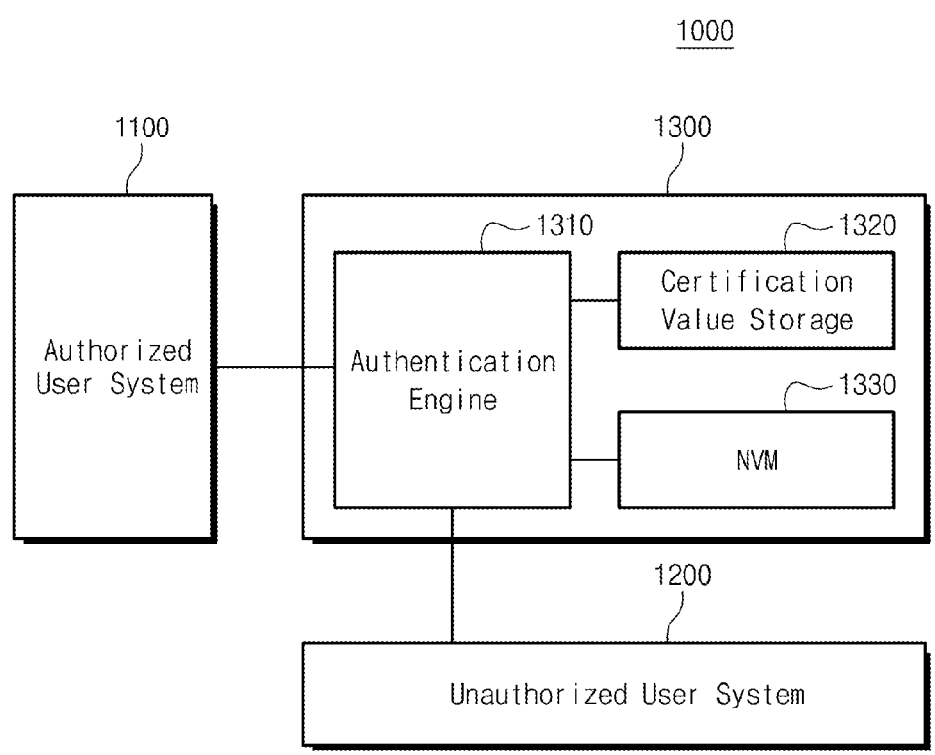
FIG. 1 is a block diagram schematically illustrating an authorization system according to example embodiments of inventive concepts.

Various example embodiments will now be described more fully with reference to the accompanying drawings in which some example embodiments are shown. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments of inventive concepts described herein relate to nonvolatile memory devices and/or authorization systems, and more particularly, relate to operating methods of a nonvolatile memory module using a plurality of device identifiers.

A nonvolatile memory module according to example embodiments of inventive concepts may generate a certification value based on device identifiers of devices included in an authorized user system. If the nonvolatile memory module is connected with an unauthorized user system, it may perform an access certification operation based on the certification value to limit an access of the unauthorized user system.

Also, when the nonvolatile memory module is connected with an unauthorized user system, it may perform an access certification operation based on the certification value to delete data stored data in the nonvolatile memory module. Thus, it is provided the nonvolatile memory module with improved security.

FIG. 1 is a block diagram schematically illustrating an authorization system according to example embodiments of inventive concepts.

For ease of description, FIG. 1 shows an exemplary authorization system 1000 in which an authorized user system 1100 and an unauthorized user system 1200 are included together. However, inventive concepts are not limited thereto.

Referring to FIG. 1, the authorization system 1000 may include an authorized user system 1100, an unauthorized user system 1200, and a memory module 1300. The authorized user system 1100 may be a user system which is allowed to access the memory module 1300. The unauthorized user system 1200 may be a user system in which an access to the memory module 1300 hacked or stolen is limited. The authorized user system 1100 and the unauthorized user system 1200 may be computing systems (e.g., a desktop computer, a notebook computer, a smart phone, a PDA, and etc.). The authorized user system 1100 and the unauthorized user system 1200 may use the memory module 1300 as a main memory.

The memory module 1300 may include an authentication engine 1310, certification value storage 1320, and a nonvolatile memory 1330. The authentication engine 1310 may perform an initialization operation when connected with the authorized user system 1100. For example, the authorized user system 1100 may use the memory module 1300 as a main memory. In this case, the authentication engine 1310 may receive device identifiers of multiple devices included in the authorized user system 1100. The authentication engine 1310 may generate a certification value based on the input device identifiers. The authentication engine 1310 may perform an access certification operation of an external system based on the certification value generated. A generating method for the certification value and an access certification operation of the memory module 1300 will be more fully described below.

The certification value storage 1320 may store the certification value generated by the authentication engine 1310. Although not shown, the certification value storage 1320 can be included in the nonvolatile memory 1330.

The nonvolatile memory 1330 may be used as a main memory of the authorized user system 1100. The nonvolatile memory 1330 may store processes to be executed by the authorized user system 1100 or data which processes refer to. In example embodiments, the nonvolatile memory 1330 may be one of a magnetic RAM (MRAM), a resistive RAM (RRAM), a phase change RAM (PRAM), and a ferroelectric RAM (FRAM).

With the above description, the memory module 1300 may generate a certification value based on the authorized user system 1100 and limit (or, alternatively, prevent) an access of the unauthorized user system 1200. Thus, there is provided a memory module with improved security.

Figure 2:
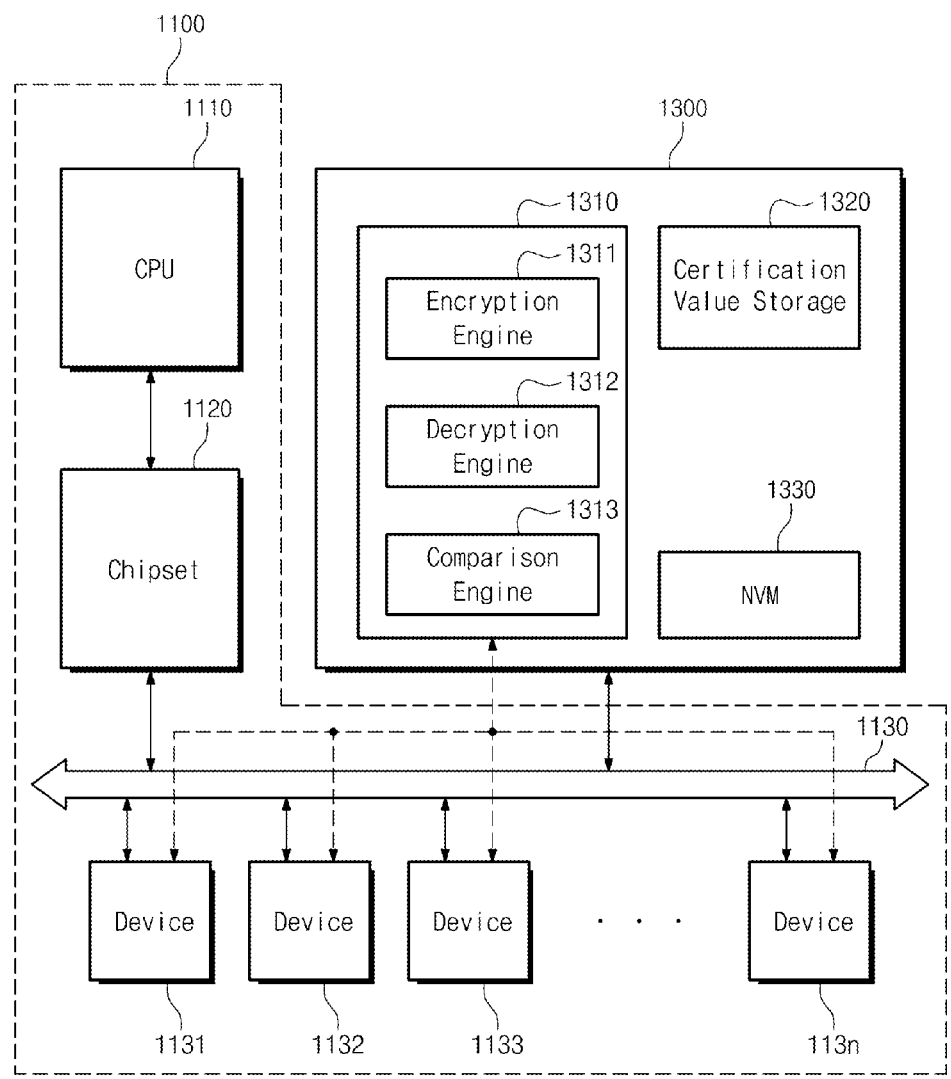
FIG. 2 is a block diagram schematically illustrating an authorized user system and a memory module of FIG. 1.

FIG. 2 is a block diagram schematically illustrating an authorized user system and a memory module of FIG. 1.

Referring to FIG. 2, the authorized user system 1100 may include a CPU 1110, a chipset 1120, a system bus 1130, and first to nth devices 1131 to 113n. The authorized user system 1100 may be electrically connected with the memory module 1300. The memory module 1300 may operate as a main memory of the authorized user system 1100.

The CPU 1110 may be a device which controls devices included in the authorized user system 1100, and decodes and executes a program command.

The chipset 1120 may control hardware of the authorized user system 1100 according to a control of the CPU 1110. For example, the chipset 1120 may adjust control signals of the memory module 1300 and the first to nth devices 1131 to 113n. The chipset 1120 may be used as a bridge between buses included in the authorized user system 1100.

The system bus 1130 may be connected with the chipset 1120, memory module 1300 and first to nth devices 1131 to 113n, and provide a data transfer channel.

The first to nth devices 1131 to 113n may be hardware which provides data input, output and storage functions such that the authorized user system 1100 is driven. For example, the first to nth devices 1131 to 113n may be devices such as a graphic card, a sound card, a network card, a keyboard, a monitor, a storage device, and so on.

The first to nth devices 1131 to 113n may have different unique device identifiers. For example, the first device 1131 may be a graphic card, the second device 1132 may be a graphic card having the same type as the first device 1131, and the third device 1133 may be a network card. The first to third devices 1131 to 1133 may have different device identifiers, respectively. Thus, in the event that a certification value is generated based on the first to nth devices 1131 to 113n included in the authorized user system 1100, it is impossible to hack or duplicate the generated certification value.

In example embodiments, the first to nth devices 1131 to 113n may be divided into internal devices and external devices. For example, in a case where an authorized user system 1100 is a desktop computer, internal devices may be devices included within a motherboard like an embedded graphic device, an embedded sound device, an embedded network device, and so on. External devices may be devices separated from a motherboard like an external storage device, an external graphic device, a keyboard, a mouse, a monitor, and so on. In example embodiments, the memory module 1300 may generate a certification value based on a device identifier of an internal device, or an external device according to a selected security level.

The memory module 1300 may be used as a main memory of the authorized user system 1100. The memory module 1300 may include an authentication engine 1310, certification value storage 1320, and a nonvolatile memory 1330. The authentication engine 1310 may include an encryption engine 1311, a decryption engine 1312, and a comparison engine 1313.

The encryption engine 1311 may receive device identifiers of the first to nth devices 1131 to 113n in the authorized user system 1100. The encryption engine 1311 may generate a certification value based on the received device identifiers. For example, the encryption engine 1311 may generate a certification value by combining the received device identifiers based on a hash algorithm.

The encryption engine 1311 may encrypt the certification value generated. The encryption engine 1311 may include encryption algorithms such as DES (Data Encryption Standard), 3-DES, IDEA (International Data Encryption Algorithm), RC2, RC4, AES (Advanced Encryption Standard), SEED, ARIA, MASK, RSA (Riverst Shamir Adleman), DSA (Digital Signature Algorithm), DSS (Digital Signature Standard), and so on. In example embodiments, the encryption engine 1311 may perform encryption selectively according to a selected security level.

The decryption engine 1312 may decrypt a certification value generated by the encryption engine 1311. In example embodiments, a decryption algorithm of the decryption engine 1312 may be decided according to an encryption algorithm of the encryption engine 1311. In the event that a certification value is not encrypted, decryption by the decryption engine 1312 may not be made.

The comparison engine 1313 may compare a certification value decrypted by the decryption engine 1312 with a certification key generated based on device identifiers of the first to nth devices 1131 to 113n included in the authorized user system 1100. The memory module 1300 may control an access to the nonvolatile memory 1330 according to the comparison result of the comparison engine 1313. In a case where the memory module 1300 generates a certification value based on the authorized user system 1100, the authorized user system 1100 may access the nonvolatile memory 1330. An access certification method will be described in conjunction with FIGS. 5 and 6.

The nonvolatile memory 1330 may store a process executed by the CPU 1110, or data which processes refer to.

With the above description, the memory module 1300 may operate as a main memory of the authorized user system 1100. The memory module 1300 may generate a certification value based on first to nth devices included in the authorized user system 1100. Thus, because it is impossible to hack or duplicate a generated certification value, there may be provided a memory module with improved security.

Figure 3:
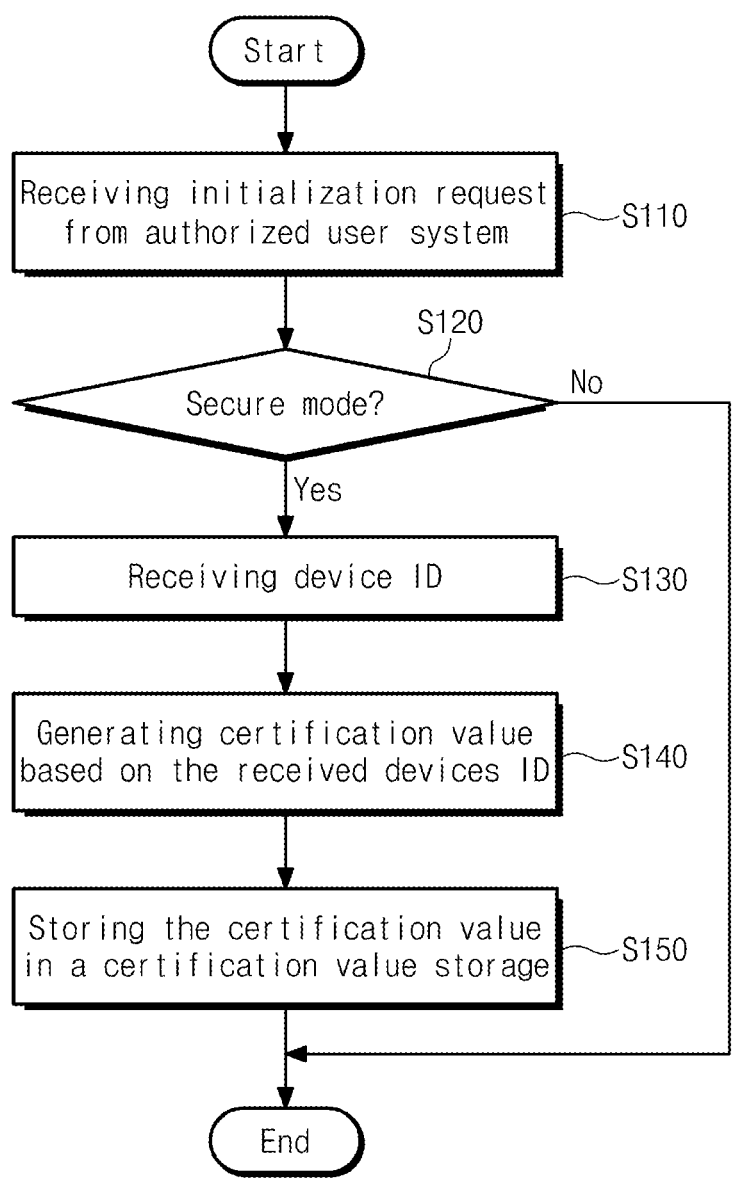
FIG. 3 is a flow chart schematically illustrating a certification value generating method of a memory module according to example embodiments of inventive concepts.

FIG. 3 is a flow chart schematically illustrating a certification value generating method of a memory module according to example embodiments of inventive concepts.

Referring to FIGS. 1 to 3, in operation S110, a memory module 1300 may receive an initialization request. Initialization may indicate an operation in which an authorized user system sets a secure level of the memory module 1300, an operation of selecting devices according to the set secure level, and an operation of generating a certification value based on device identifiers of selected devices. For example, in a first operation of the memory module 1300, the memory module 1300 may be connected with the authorized user system 1100. In this case, the memory module 1300 may receive an initialization request from the authorized user system 1100. In example embodiments, the memory module 1300 can receive the initialization request from the authorized user system 1100 in another operation, not the first operation.

In operation S120, an operation mode of the memory module 1300 may be one selected from a secure mode and a normal mode. In a case where the normal mode is selected, the memory module 1300 may not perform a certification value generating operation and an access certification operation (refer to FIG. 5). If the secure mode is selected, a secure level may be selected. Devices, used to generate a certification value, from among first to nth devices 1131 to 113*n* in the authorized user system 1100 may be selected. The secure level will be more fully described in conjunction with FIG. 4.

If the secure mode is selected in operation S120, the method may proceed to operation S130, in which the memory module 1300 may receive device identifiers of one or more devices among the first to nth devices 1131 to 113*n* in the authorized user system 1100. In example embodiments, the received device identifiers may be device identifiers of devices selected in operation S120. In example embodiments, the memory module 1300 may receive device identifiers of all of the first to nth devices 1131 to 113*n*.

In operation S140, the memory module 1300 may generate a certification value based on the received device identifiers. For example, the memory module 1300 may receive device identifiers of the first to third devices 1131 to 1133. The device identifiers of the first to third devices 1131 to 1133 may be different from one another. The memory module 1300 may generate a certification value based on the received device identifiers. In example embodiments, the memory module 1300 may encrypt the certification value which is selectively generated according to a secure level selected in operation S120.

In operation S150, the memory module 1300 may store the generated certification value in certification value storage 1320. In example embodiments, the memory module 1300 may store the generated certification value in a part of the nonvolatile memory 1330.

The memory module 1300 according to example embodiments of inventive concepts may generate a certification value based on device identifiers of devices included in the authorized user system 1100. Also, as randomness of the certification value increases according to a selected secure level, hacking and duplication of the certification value may be impossible. Thus, there may be provided a memory module with improved security.

Figure 4:
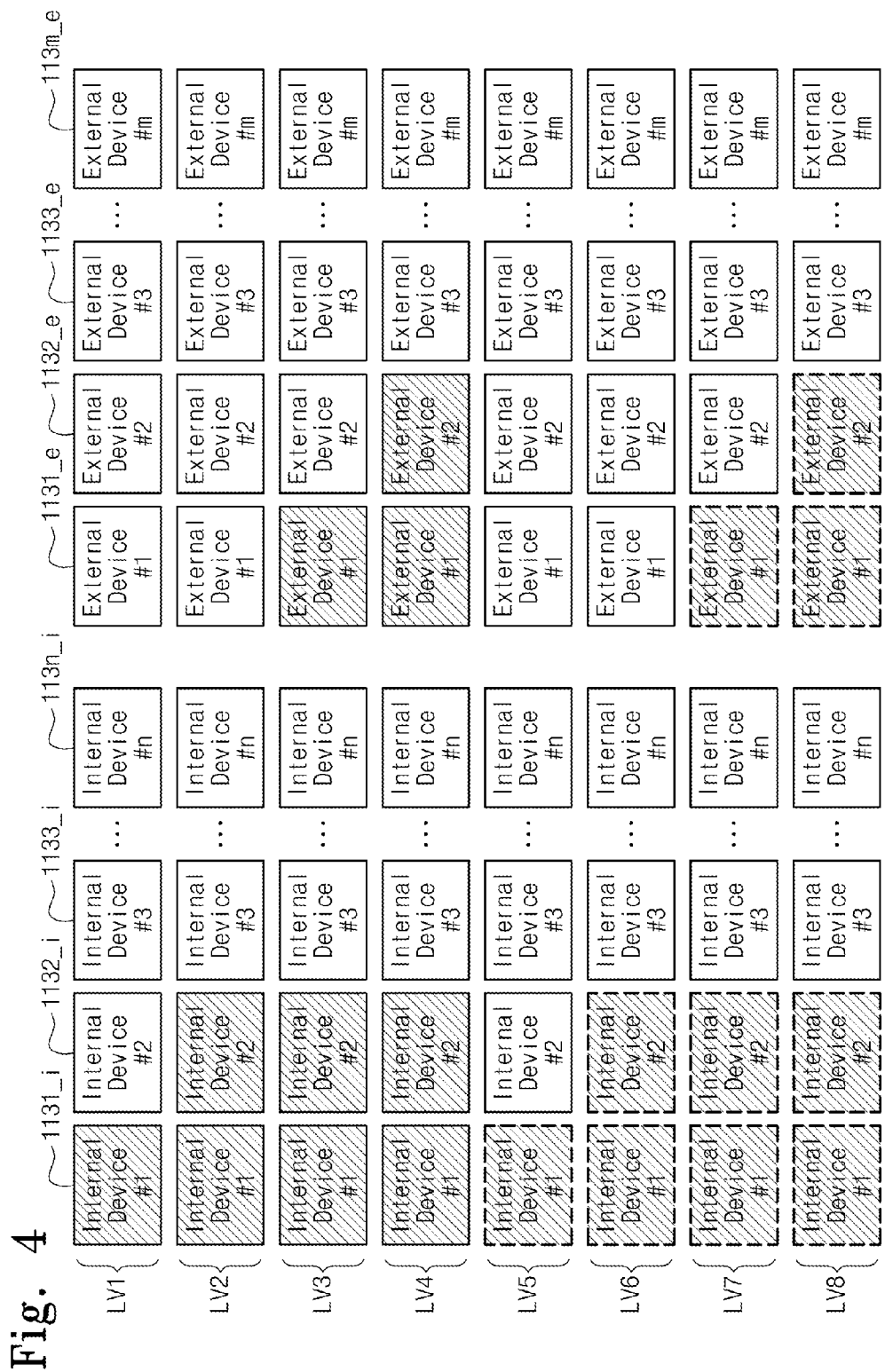
FIG. 4 is a diagram describing a secure level of a memory module of FIG. 1.

FIG. 4 is a diagram describing a secure level of a memory module of FIG. 1.

In FIG. 4, there is illustrated an example in which an authorized user system 1100 includes a plurality of internal devices 1131_*i* to 113*n*_*i* and a plurality of external devices 1131_*e* to 113*m*_*e*. In example embodiments, a secure level of the memory module 1300 may be one of first to eighth levels LV1 to LV8. However, inventive concepts are not limited thereto.

Referring to FIGS. 1 and 4, a secure level of the memory module 1300 may be selected to have one of first to eighth levels LV1 to LV8. Devices used to generate a certification value may be selected according to the selected secure level, and whether to perform an encryption operation may be selected according to the selected secure level.

In the first level LV1, a device identifier of one of first to nth internal devices 1131_*i* to 113*n*_*i* may be used to generate a certification value. For example, in the first level LV1, a memory module 1300 may generate the certification value based on the first internal device 1131_*i*.

In the second level LV2, device identifiers of two or more internal devices among the first to nth internal devices 1131_*i* to 113*n*_*i* may be used to generate a certification value. For example, in the second level LV2, the memory module 1300 may generate the certification value based on device identifiers of the first and second internal devices 1131_*i* and 1132_*i*.

In the third level LV3, device identifiers of two or more internal devices of the internal devices 1131_*i* to 113*n*_*i* and a device identifier of one of external devices 1131_*e* to 113*n*_*e* may be used to generate a certification value. For example, in the third level LV3, the memory module 1300 may generate the certification value based on the device identifiers of first and second internal devices 1131_*i* and 1132_*i* and a device identifier of the first external device 1131_*e*.

In the fourth level LV4, device identifiers of two or more internal devices of the internal devices 1131_*i* to 113*n*_*i* and device identifiers of two or more external devices among the external devices 1131_*e* to 113*n*_*e* may be used to generate a certification value. For example, in the fourth level LV4, the memory module 1300 may generate the certification value based on the device identifiers of the first and second internal devices 1131_*i* and 1132_*i* and the device identifiers of the first and second external devices 1131_*e* and 1132_*e*.

In the fifth level LV5, the memory module 1300 may encrypt the certification value of the first level LV1. In the sixth level LV6, the memory module 1300 may encrypt the certification value of the second level LV2. In the seventh level LV7, the memory module 1300 may encrypt the certification value of the third level LV3. In the eighth level LV8, the memory module 1300 may encrypt the certification value of the fourth level LV4.

With the above description, as the secure level increases from the first level LV1 to the fourth level LV4, the number of devices selected may increase. In this case, the length of the certification value may increase, so that randomness of the certification value increases. Also, as device identifiers of external devices detachable from a user system are used to generate a certification value, the security of the memory module may be improved.

In a case where the secure level is over the fifth level, the probability that a certification value is exposed may be reduced. Also, because a certification value is generated based on device identifiers of devices included in a user system, the probability that the device identifiers is hacked and duplicated may be reduced. Thus, there may be provided a memory module with improved security.

Figure 5:
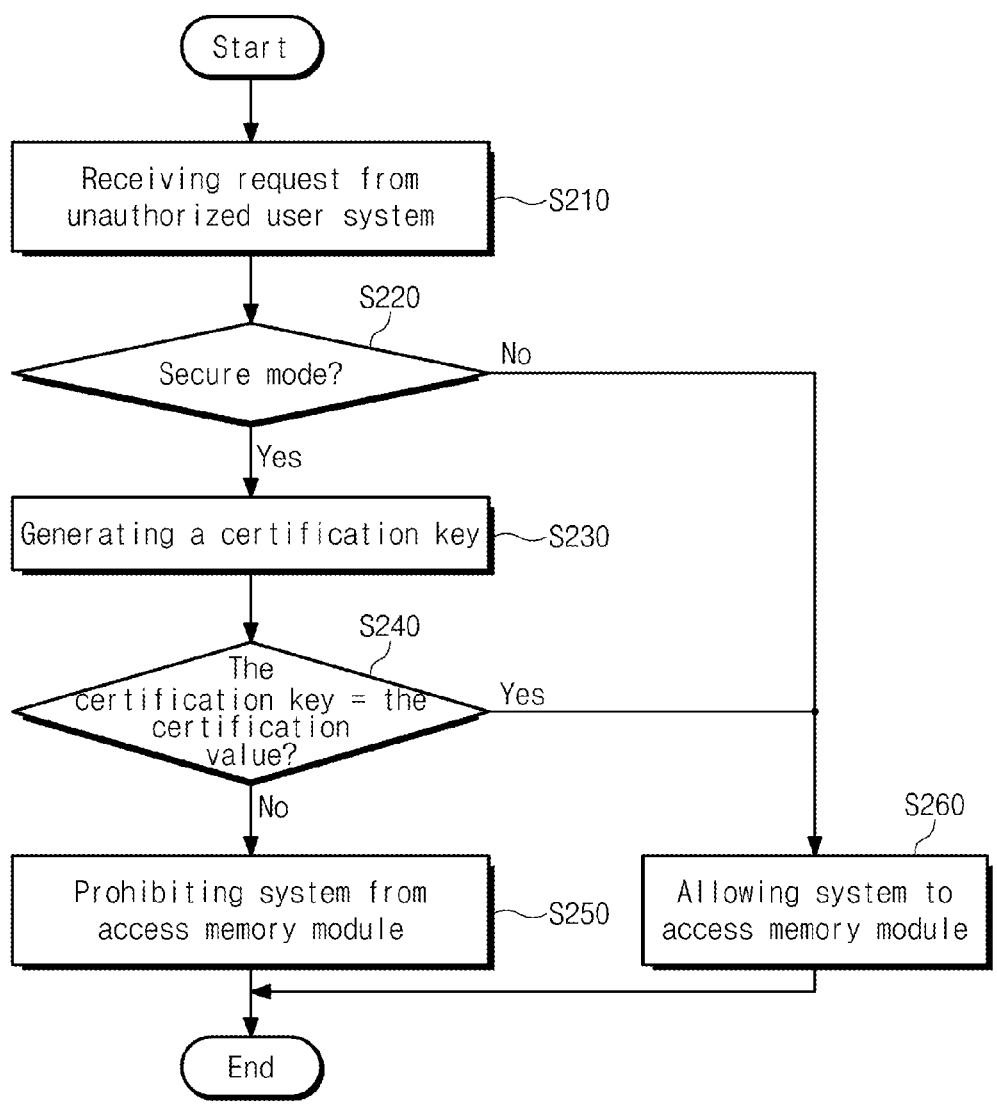
FIG. 5 is a flow chart schematically illustrating an access certification method of a memory module according to example embodiments of inventive concepts.

FIG. 5 is a flow chart schematically illustrating an access certification method of a memory module according to example embodiments of inventive concepts.

In example embodiments, a memory module 1300 may generate a certification value based on the method described with reference to FIGS. 3 and 4. For ease of description, it is assumed that the memory module 1300 is connected with an authorized user system 1100 to perform a certification value generating method described with reference to FIG. 3 and then is connected with an unauthorized user system 1200 to operate according to a method of FIG. 5.

Referring to FIGS. 1 and 5, in operation S210, the memory module 1300 may receive an access request from the unauthorized user system 1200.

In operation S220, the memory module 1300 may determine whether its state is at a secure mode. In example embodiments, if a set mode of the memory module 1300 is a secure mode, a memory module 1300 may include a certification value.

When the set mode of the memory module 1300 is not the secure mode, in operation S260, the memory module 1300 may allow the unauthorized user system 1200 to access a nonvolatile memory 1330.

When the set mode of the memory module 1300 is set to the secure mode, in operation S230, the memory module 1300 may generate a certification key based on a plurality of devices included in the unauthorized user system 1200. For example, at an operation where the memory module 1300 is connected with an authorized user system 1100 to generate a certification value, a certification value may be generated based on device identifiers of an auxiliary storage device and a USB drive connected with the authorized user system 1100. In this case, the memory module 1300 may generate a certification key based on an auxiliary storage device and a USB drive connected with the unauthorized user system 1200.

In operation S240, the memory module 1300 may compare the certification value and the certification key. For example, a certification value included in the memory module 1300 may be a value generated based on device identifiers of devices included in the authorized user system 1100. Because the unauthorized user system 1200 is different from the authorized user system 1100, the certification value may be different from the certification key. For example, in a case where authorized and unauthorized user systems 1100 and 1200 are equal to each other (e.g., devices included in the authorized and unauthorized user systems 1100 and 1200 have the same device identifiers), the certification value may equal to the certification key.

If the certification value is equal to the certification key, in operation S260, the memory module 1300 may allow an access of the unauthorized user system 1200.

If the certification value is not equal to the certification key, in operation S250, the memory module 1300 may prohibit an access of the unauthorized user system 1200.

With the above description, the memory module 1300 may generate a certification value based on an authorized user system. In a case where the memory module 1300 is connected with the unauthorized user system 1200, the memory module 1300 may generate a certification key based on devices included in the unauthorized user system 1200 to compare it with a previously generated certification value. Because device identifiers of devices in the unauthorized user system 1200 are different from those in the authorized user system, the memory module 1300 may prohibit an access of the unauthorized user system 1200. Thus, there may be provided a memory module with improved security.

Figure 6:
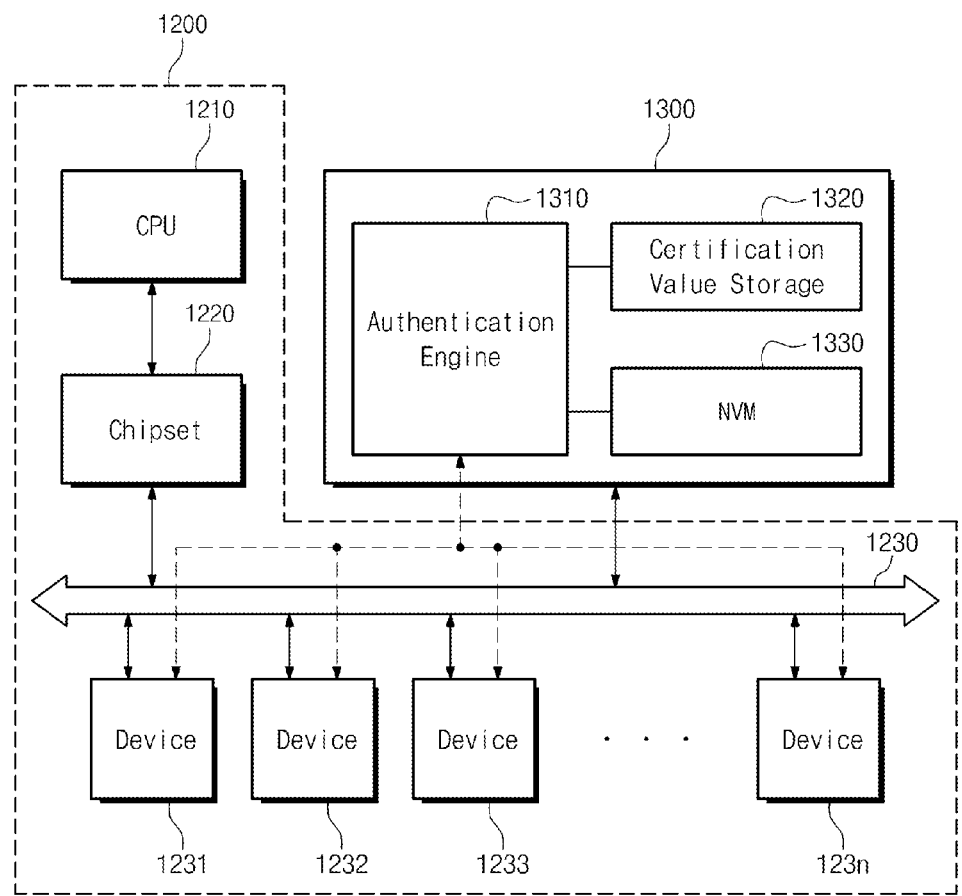
FIG. 6 is a block diagram schematically illustrating an unauthorized user system and a memory module of FIG. 1.

FIG. 6 is a block diagram schematically illustrating an unauthorized user system and a memory module of FIG. 1.

For ease of description, it is assumed that after a memory module 1300 is connected with an authorized user system 1100 to generate a certification value, it is connected with an unauthorized user system 1200 to operate as a main memory.

Referring to FIG. 6, the unauthorized user system 1200 may include a CPU 1210, a chipset 1220, a system bus 1230, and first to nth devices 1231 to 123$n$. The components 1210, 1220, 1230, and 1231 to 123$n$ of the unauthorized user system 1200 may operate substantially the same as those in an authorized user system 1100 of FIG. 2, and a description thereof is thus omitted. Device identifiers of devices 1131 to 113$n$ of the authorized user system 1100 may be different from device identifiers of devices 1231 to 123$n$ of the unauthorized user system 1200.

The memory module 1300 may be used as a main memory of the unauthorized user system 1200. The memory module 1300 may include an authentication engine 1310, certification value storage 1320, and a nonvolatile memory 1330. The components 1310, 1320 and 1330 may be substantially the same as those in FIG. 2, and a description thereof is thus omitted.

The memory module 1300 may include a certification value generated based on the authorized user system 1100. The memory module 1300 may generate a certification key based on first to nth devices 1231 to 123$n$ of the unauthorized user system 1200. The memory module 1300 may compare the certification key and the certification value.

In example embodiments, if the authorized user system 1100 is different from the unauthorized user system 1200, device identifiers of the devices 1131 to 113$n$ included in the authorized user system 1100 may be different from device identifiers of the devices 1231 to 123$n$ included in the unauthorized user system 1200. In addition, although the authorized user system 1100 and the unauthorized user system 1200 include the same sorts of devices, device identifiers of the respective devices may be different from one another. That is, the certification value may be different from the certification key. Thus, the memory module 1300 may prohibit an access of the unauthorized user system 1200 to a nonvolatile memory 1330.

With the above description, the memory module 1300 may prohibit an access of the unauthorized user system 1200. Thus, there may be provided a memory module with improved security.

Figure 7:
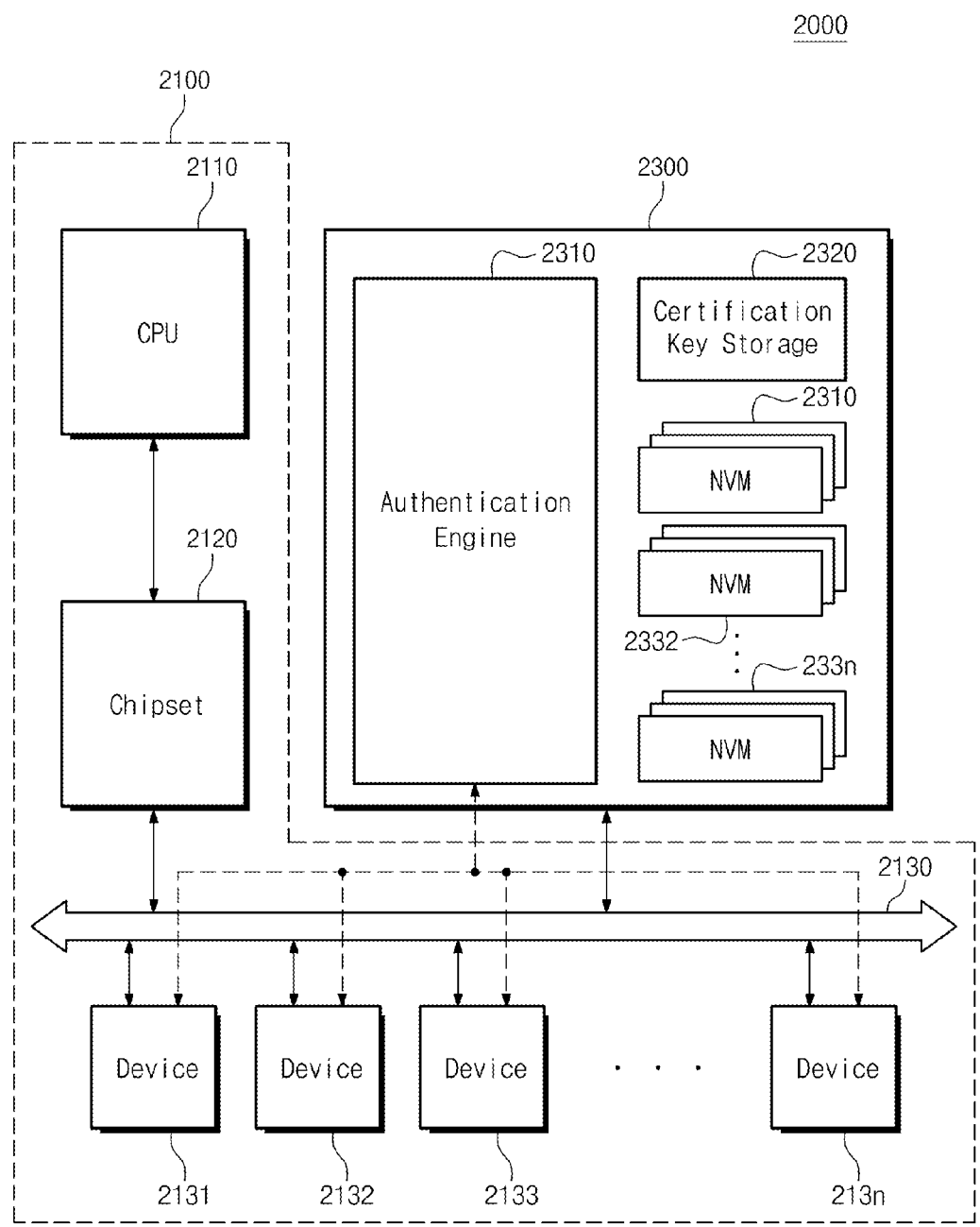
FIG. 7 is a block diagram schematically illustrating an authorization system according to example embodiments of inventive concepts.

FIG. 7 is a block diagram schematically illustrating an authorization system according to other example embodiments of inventive concepts.

In FIG. 7, there is illustrated an example in which an authorization system 2000 includes an authorized user system 2100 and a memory module 2300. However, inventive concepts are not limited thereto.

Referring to FIG. 7, the authorized user system 2100 may include a CPU 2110, a chipset 2120, a system bus 2130, and first to nth devices 2131 to 213$n$. The components 2110, 2120, 2130, and 2131 to 213$n$ of the authorized user system 2100 may operate substantially the same as those in an authorized user system 1100 of FIG. 2, and a description thereof is thus omitted.

The memory module 2300 may include an authentication engine 2310, certification value storage 2320, and a plurality of nonvolatile memory blocks 2331 to 233$n$. The term "nonvolatile memory block" may be used to indicate a memory chip including a plurality of memory cells, a package including a plurality of memory chips, or a module including a plurality of packages. Also, the nonvolatile memory block may indicate a set of logical address regions. The memory module 2300 may generate a certification value according to a method described with reference to FIG. 6 and perform an access certification operation. The memory module 2300 may operate as a main memory, or an auxiliary memory, of the authorized user system 2100.

In example embodiments, the nonvolatile memory blocks 2331 to 233$n$ may be set to have different secure levels. The authentication engine 2310 may generate certification values each corresponding to the nonvolatile memory blocks 2331 to 233$n$. For example, the first nonvolatile memory block 2310 may be set to a normal mode. The second nonvolatile memory block 2332 may be set to a secure level corresponding to a second level. In this case, the authorized user system 2100 may access the first nonvolatile memory block 2310 without a separate certification procedure. In a case where the authorized user system 2100 accesses the second nonvolatile memory block 2332, the memory module 2300 may perform an access certification operation based on a secure level (e.g., the second level) corresponding to the second nonvolatile memory block 2332.

With the above description, it is possible to set nonvolatile memory blocks in the memory module 2300 to different secure levels. Thus, because it is easy to access data not necessitating security, the performance of the memory module 2300 may be improved.

Figure 8:
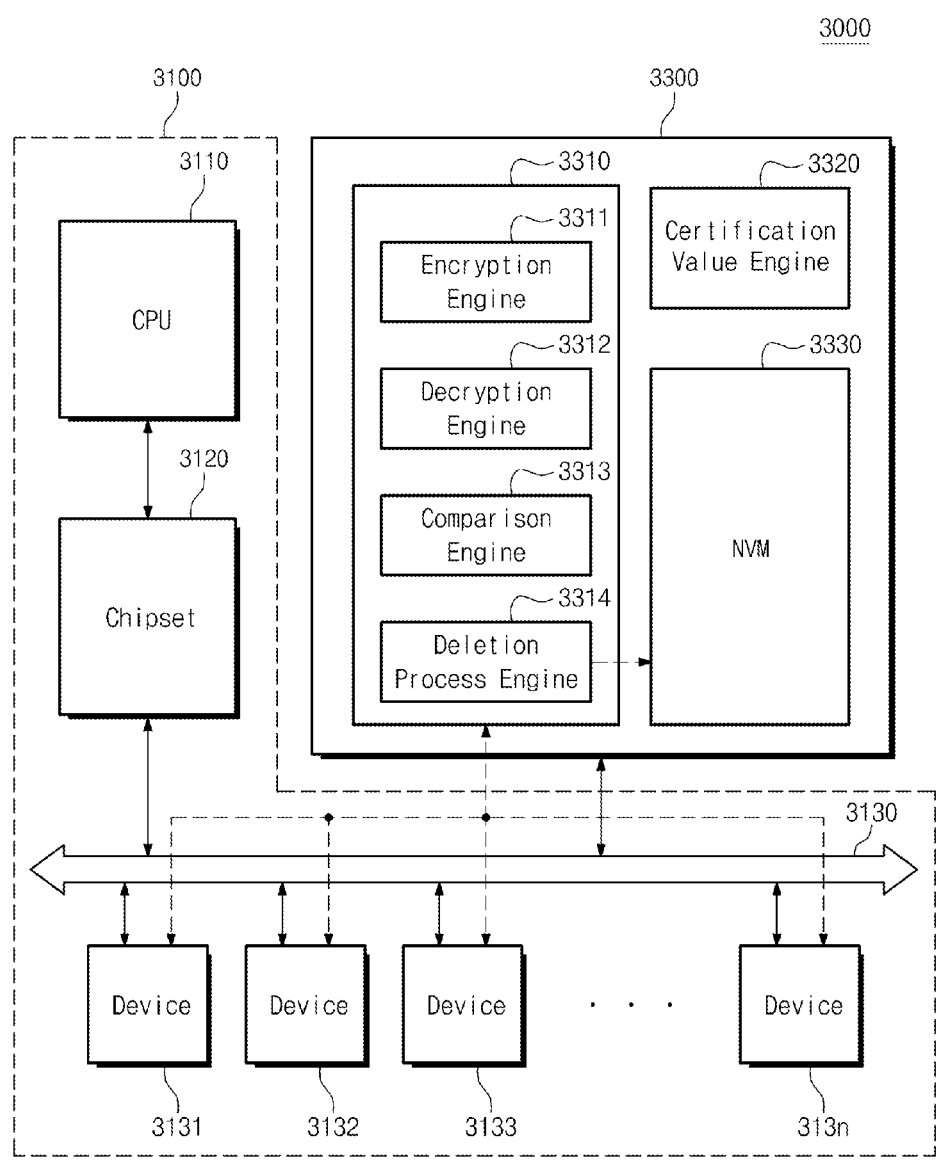
FIG. 8 is a block diagram schematically illustrating an authorization system according to still other example embodiments of inventive concepts.

FIG. 8 is a block diagram schematically illustrating an authorization system according to still other example embodiments of inventive concepts.

In FIG. 8, there is illustrated an example in which an authorization system 3000 includes an authorized user system 3100 and a memory module 3300. However, inventive concepts are not limited thereto.

Referring to FIG. 8, the authorized user system 3100 may include a CPU 3110, a chipset 3120, a system bus 3130, and first to nth devices 3131 to 313n. The components 3110, 3120, 3130, and 3131 to 313n of the authorized user system 3100 may operate substantially the same as those in an authorized user system 1100 of FIG. 2, and a description thereof is thus omitted.

The memory module 3300 may include an authentication engine 3310, certification value storage 3320, and a nonvolatile memory 3330. The authentication engine 3310 may include an encryption engine 3311, a decryption engine 3312, a comparison engine 3313, and a deletion process engine 3314. The components 3311, 3312, 3313, 3320 and 3330 of FIG. 8 may be substantially the same as described with reference to FIG. 2, and a description thereof is thus omitted. Compared with a memory module 1300 of FIG. 2, the memory module 3300 of FIG. 8 may further comprise the deletion process engine 3314.

The deletion process engine 3314 may invalidate data stored at the nonvolatile memory 3330. Data invalidation may mean operations such as deletion of data stored a nonvolatile memory area, overwriting of random data at a nonvolatile memory area where data is stored, insertion of random data, insertion of the same data pattern, a process initialization of a nonvolatile memory, and so on. For example, in the event that the memory module 3300 is connected with an unauthorized user system, the memory module 3300 may prohibit an access of the unauthorized user system. At this time, the deletion process engine 3314 may invalidate data stored at the nonvolatile memory 3330 to prevent data stored at the nonvolatile memory 3330 from being leaked.

In example embodiments, the deletion process engine 3314 may first invalidate metadata stored at the nonvolatile memory 3330. The metadata may be data indicating information of data stored at the nonvolatile memory 3330. In other words, if the metadata is invalidated, it is impossible to read data stored at the nonvolatile memory 3330.

In example embodiments, the nonvolatile memory 3330 may be divided into a plurality of regions. The nonvolatile memory 3330 may include a plurality of nonvolatile memory blocks, which store different types of data. For example, a first nonvolatile memory block may store processes used at the authorized user system 3100. A second nonvolatile memory block may store data which processes stored at the first nonvolatile memory block refer to. A third nonvolatile memory block may store metadata of the authorized user system 3100. In a case where an unauthorized user system accesses a memory module, the deletion process engine 3314 may first invalidate metadata stored at the third nonvolatile memory block. Data may be prevented from being leaked through the unauthorized user system by first invalidating the metadata through the deletion process engine 3314.

Figure 9:
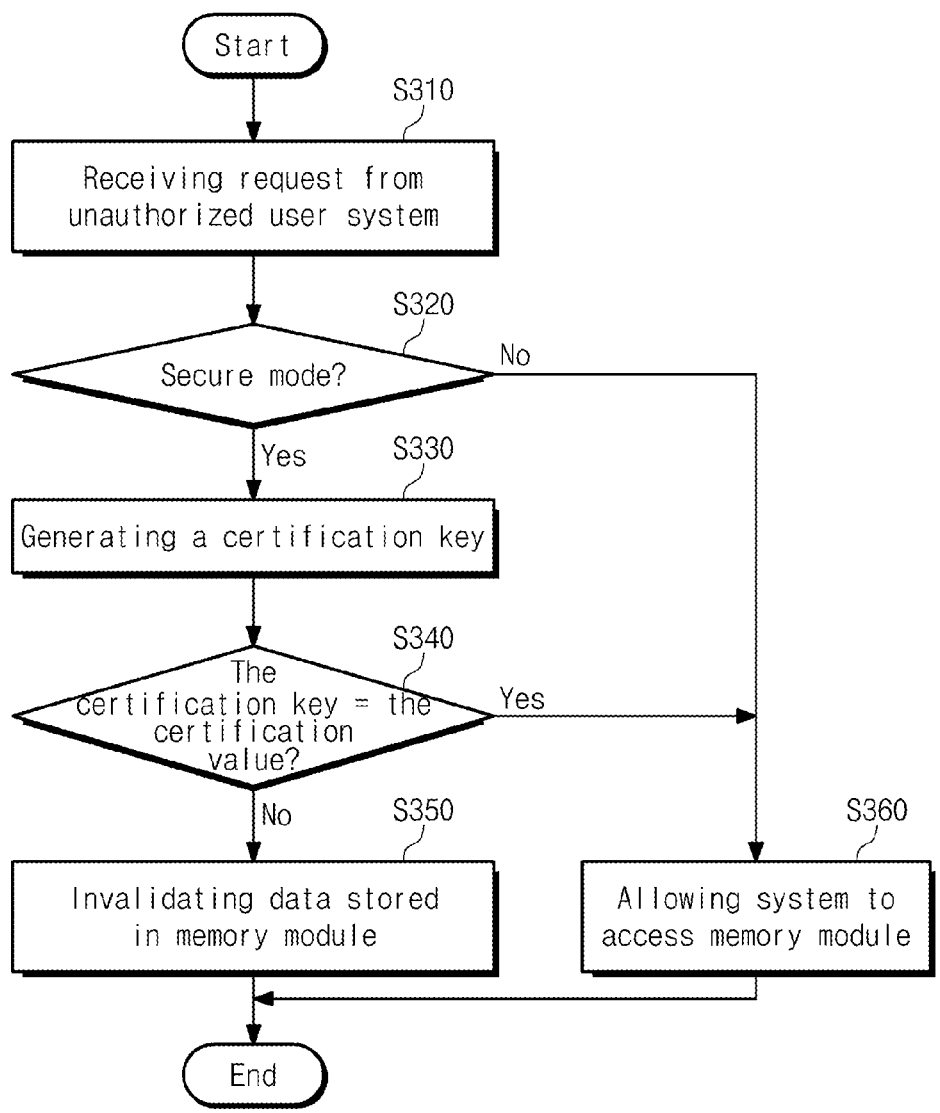
FIG. 9 is a flow chart schematically illustrating an access certification method of a memory module of FIG. 8.

FIG. 9 is a flow chart schematically illustrating an access certification method of a memory module of FIG. 8.

Operations S310 to S340 of FIG. 9 may be equal to operations S210 to S240 of FIG. 5, and a description thereof is thus omitted.

If a comparison result of operation S340 indicates that a certification value is equal to a certification key, in operation S360, a memory module 3300 may allow an access to a nonvolatile memory 3330.

If the comparison result of operation S340 indicates that the certification value is not equal to the certification key, in operation S350, the memory module 3300 may invalidate data stored at the nonvolatile memory 3330. For example, the memory module 3300 may first invalidate metadata stored at the nonvolatile memory 3330. Afterwards, the memory module 3300 may invalidate a process stored at the nonvolatile memory 3330 and data which a process refers to. The metadata may include a mapping table of data stored in the nonvolatile memory 3330, authorized user system information, and so on. Thus, data may be prevented from being leaked through an unauthorized user system by first invalidating the metadata.

With the above description, the memory module 3300 may prevent data leakage by prohibiting an access of an unauthorized user system and invalidating data stored at the nonvolatile memory 3330.

Figure 10:
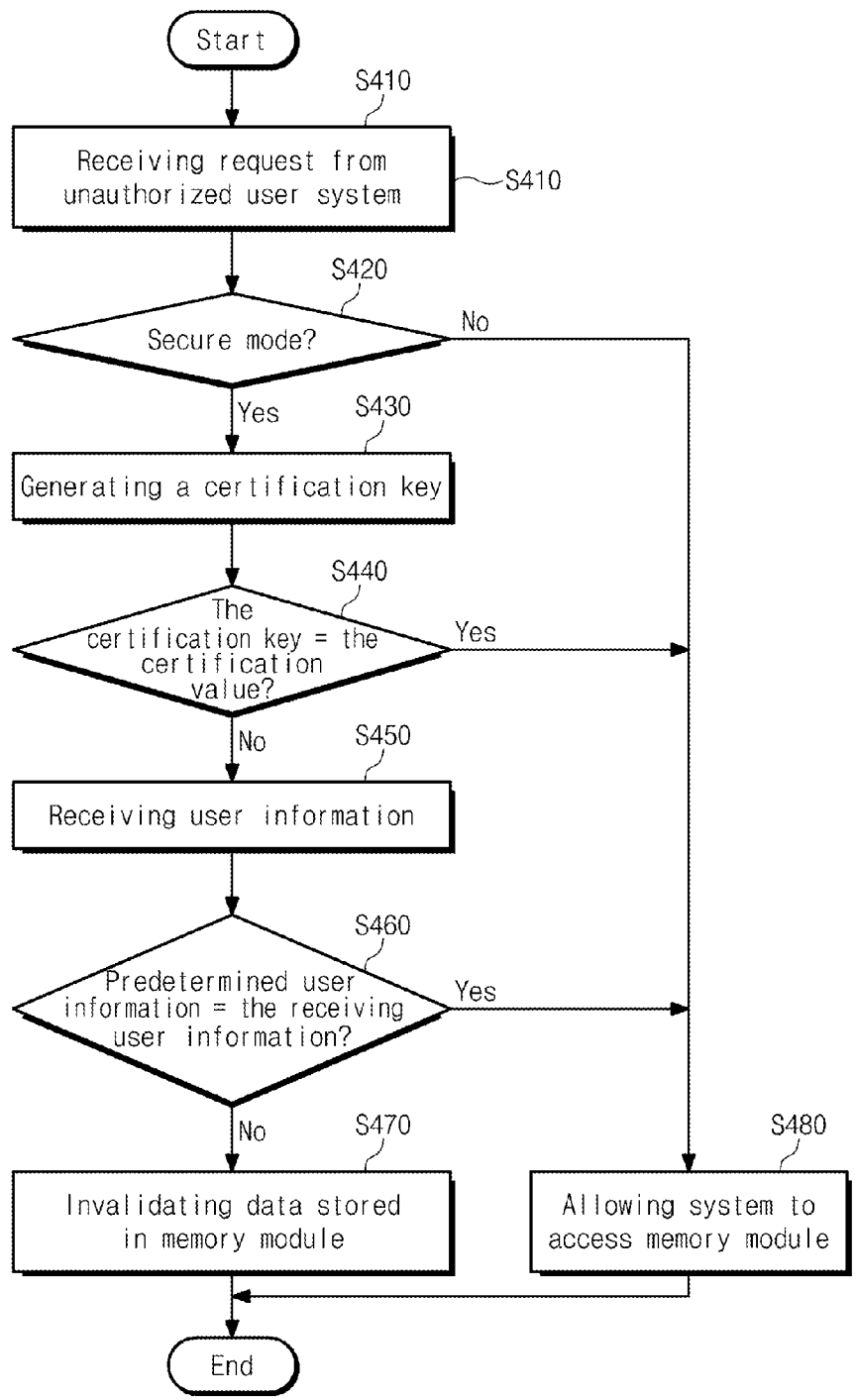
FIG. 10 is a flow chart schematically illustrating an access certification method of a memory module according to other example embodiments of inventive concepts.

FIG. 10 is a flow chart schematically illustrating an access certification method of a memory module according to other example embodiments of inventive concepts.

Unlike an access certification method of a memory module illustrated in FIG. 9, an access certification method of a memory module of FIG. 10 may further comprise an operation of receiving user information to perform a certification operation.

Operations S410 to S440 of FIG. 10 may be equal to operations S210 to S240 of FIG. 5, and a description thereof is thus omitted.

If a comparison result of operation S340 indicates that a certification value is not equal to a certification key, in operation S450, a memory module 3300 may receive user information from a user system connected with the memory module 3300. The user information may indicate user identification and password. In example embodiments, there may be included predetermined (or, select) user information at an initialization operation of the memory module 3300. The predetermined (or, select) user information may be stored at certification value storage.

In operation S460, the memory module 3300 may compare the predetermined (or, select) user information with the received user information.

If the predetermined (or, select) user information is different from the received user information, in operation S470, the memory module 3300 may invalidate data stored at the nonvolatile memory 3330. For example, the memory module 3300 may first invalidate metadata of data stored at the nonvolatile memory 3330.

If the predetermined (or, select) user information is equal to the received user information, in operation S480, the memory module 3300 may allow an access of the connected user system to the nonvolatile memory 3330.

With the above description, the memory module 3300 may generate a certification value based on device identifiers of devices included in an authorized user system. A memory module may perform an access certification operation using the generated certification value. Because it is impossible to hack or duplicate device identifiers of devices included in the authorized user system, an access of authorized and unauthorized user systems to a memory module may be prohibited.

Also, data leakage may be prevented by invalidating data of a nonvolatile memory based on an erasing, overwriting or random data pattern inserting operation when an unauthorized user system accesses. Thus, there may be provided a memory module with improved security.

While inventive concepts have been described with reference to example embodiments, it will be apparent to those skilled in the art that various changes and modifications may be made without departing from the spirit and scope. Therefore, it should be understood that the above example embodiments are not limiting, but illustrative.

What is claimed is:

1. A memory module, comprising:
   a nonvolatile memory;
   an authentication engine configured to receive an initialization request from a user system, the authentication engine including an encryption engine configured to generate a certification value based on a combination of at least two device identifiers from different devices included in the user system in response to the initialization request and configured to control access to the nonvolatile memory based on the certification value; and
   a certification value storage configured to store the certification value,
   wherein the authentication engine is configured to generate a certification key based on the at least two device identifiers of the devices included in the user system, when the user system accesses the nonvolatile memory after generation of the certification value at a first time,
   the authentication engine is configured to encrypt the certification value according to a selected secure level,
   the authentication engine is configured to compare the certification value and the certification key, and
   the authentication engine is configured to control access to the nonvolatile memory according to the comparison result.

2. The memory module of claim 1, wherein the authentication engine is configured to allow access of the user system to the nonvolatile memory when the certification value is equal to the certification key, and to prohibit access of the user system to the nonvolatile memory when the certification value is not equal to the certification key.

3. The memory module of claim 1, wherein
   the encryption engine is configured to encrypt the certification value to generate an encrypted certification value, and
   the authentication engine further includes,
       a decryption engine configured to decrypt the encrypted certification value to generate a decrypted certification value; and
       a comparison engine configured to compare the decrypted certification value and the certification key.

4. The memory module of claim 3, wherein the authentication engine further includes, a deletion process engine configured to invalidate data stored in the nonvolatile memory when the certification value is not equal to the certification key.

5. The memory module of claim 4, wherein the deletion process engine is configured to invalidate data stored in the nonvolatile memory through one selected from deleting, overwriting, insertion of a random pattern, and insertion of a same data pattern.

6. The memory module of claim 1, wherein the nonvolatile memory is a main memory of the user system.

7. An operating method of a memory module including a nonvolatile memory, the operating method comprising:
   receiving an initialization request from a user system;
   selecting one from a secure mode and a normal mode in response to the initialization request;
   receiving at least two device identifiers from different devices included in the user system when the secure mode is selected, the receiving at least two device identifiers of devices included in the user system includes selecting a secure level of the secure mode;
   generating a certification value based on a combination of the received device identifiers;
   storing the certification value in a certification value storage;
   receiving an access certification request from the user system;
   determining whether a set mode is the secure mode or the normal mode;
   generating a certification key based on the received device identifiers when the set mode is the secure mode, the generating a certification value based on the received device identifiers includes encrypting the certification value according to the selected secure level;
   comparing the certification key and the certification value; and
   controlling access of the user system to the nonvolatile memory according to the comparison result.

8. The operating method of claim 7, wherein the receiving at least two device identifiers of devices included in the user system further includes,
   receiving a first device identifier and a second device identifier from one of the devices included in the user system according to the selected secure level.

9. The operating method of claim 7, wherein the controlling access of the user system to the nonvolatile memory according to the comparison result includes allowing access of the user system to the nonvolatile memory when the certification key is equal to the certification value.

10. The operating method of claim 7, wherein the controlling access of the user system to the nonvolatile memory according to the comparison result includes invalidating data stored at the nonvolatile memory when the certification key is not equal to the certification value.

11. The operating method of claim 7, wherein the controlling access of the user system to the nonvolatile memory according to the comparison result includes,
   receiving user information from the user system when the certification key is not equal to the certification value;
   comparing the user information and set user information; and
   controlling access of the user system to the nonvolatile memory based on the result of comparison.

12. The operating method of claim 7, wherein the receiving an access certification request from the user system comprises,
   determining whether the set mode is the secure mode or the normal mode; and
   allowing access of the user system when the set mode is the normal mode.

13. An authorization system, comprising:
   a first user system including at least two first devices;
   a memory module accessible by the first user system, wherein the memory module includes,
       at least one nonvolatile memory configured to store data,
       an authentication engine configured to control access to the at least one nonvolatile memory based on a certification value generated based a combination of device identifiers received from the at least two first devices, the authentication engine being configured to encrypt the certification value according to a selected secure level to generate an encrypted certification value, and a storage configured to store the certification value; and a second user system including at least one second device having a device identifier different than the device identifier of the at least one first device, wherein the memory module is a main memory of the second user system, and the memory module is configured to generate a certification key based on the device identifier received from the at least one second device, and configured to control access of the second user system to the at least one nonvolatile memory based on a comparison of the certification value and the certification key.

14. The authorization system of claim 13, wherein the authentication engine is configured to invalidate the data stored in the at least one nonvolatile memory and configured to block access of the second user system to the at least one nonvolatile memory, when the certification value is not equal to the certification key.

15. The authorization system of claim 13, wherein the authentication engine is configured to decrypt the encrypted certification value to generate a decrypted certification value, and configured to compare the decrypted certification value and the certification key.

16. The authorization system of claim 13, wherein the first user system includes a plurality of first devices having device identifiers different from each other, the memory module is configured to receive an initialization request from the first user system to set a secure level of the memory module, and configured to select at least one of the plurality of first devices according to the set secure level, and the certification value is based on the device identifiers of selected devices.

17. The memory module of claim 1, wherein the authentication engine is configured to generate the certification value based on a selected secure level.

* * * * *

UNITED STATES PATENT AND TRADEMARK OFFICE
CERTIFICATE OF CORRECTION

| | | |
|---|---|---|
| PATENT NO. | : 9,251,099 B2 | Page 1 of 1 |
| APPLICATION NO. | : 14/091684 | |
| DATED | : February 2, 2016 | |
| INVENTOR(S) | : Seongsik Hwang et al. | |

It is certified that error appears in the above-identified patent and that said Letters Patent is hereby corrected as shown below:

On the title page

The correct order of item 71 applicants and item 72 inventors should read as:

Seongsik HWANG
Kwanghoon KIM
Junjin KONG
Dongsoo JUN

Signed and Sealed this
Seventeenth Day of May, 2016

Michelle K. Lee
*Director of the United States Patent and Trademark Office*